United States Patent [19]

Moore

[11] Patent Number: 5,430,846
[45] Date of Patent: Jul. 4, 1995

[54] LIST-BASED BUFFERING MECHANISM FOR BUFFERING DATA BETWEEN PROCESSES IN A DATA PROCESSING SYSTEM

[75] Inventor: Stephen J. Moore, Congleton, United Kingdom

[73] Assignee: International Computers Limited, London, England

[21] Appl. No.: 31,661

[22] Filed: Mar. 15, 1993

[30] Foreign Application Priority Data

May 7, 1992 [GB] United Kingdom ............... 9209840

[51] Int. Cl.$^6$ .............................................. G06F 13/14
[52] U.S. Cl. .............................. 395/250; 364/DIG. 1; 364/DIG. 2; 364/239; 364/239.4; 364/239.5; 364/239.8
[58] Field of Search ............... 364/DIG. 1 MS File, 364/DIG. 2 MS File; 395/200, 250, 650, 375, 800

[56] References Cited

U.S. PATENT DOCUMENTS 4,864,495 9/1989 Neustaedter ..................... 395/250
4,956,771 9/1990 Inaba ................................ 395/250

OTHER PUBLICATIONS

Canada, et al., "Implementation of a CSP-based Extension of Pascal", Microprocessing and Microprogramming, vol. 22, No. 4, Oct. 1988, pp. 233-242.

"BSD Socket-Based Message Queue IPC System Implementation", IBM Technical Disclosure Bulletin, vol. 34, No. 9, Feb., 1992, pp. 168-173.

Primary Examiner—Robert B. Harrell
Attorney, Agent, or Firm—Lee, Mann, Smith, McWilliams, Sweeney & Ohlson

[57] ABSTRACT

A data processing system is described, having a buffering mechanism for buffering data between two processes. The buffering mechanism includes a container table consisting of a number of data storage containers, an allocation list indicating which containers are free, and a communication list indicating which containers currently hold data waiting to be read by the recipient. The originator writes data into the first container indicated as free by the allocation list, removing that container from the allocation list and adding that container as the last container on the communication list. The recipient reads data from the first container indicated as in use by the communication list, removing that container from the communication list, and adding that container as the last free container on the allocation list.

5 Claims, 3 Drawing Sheets

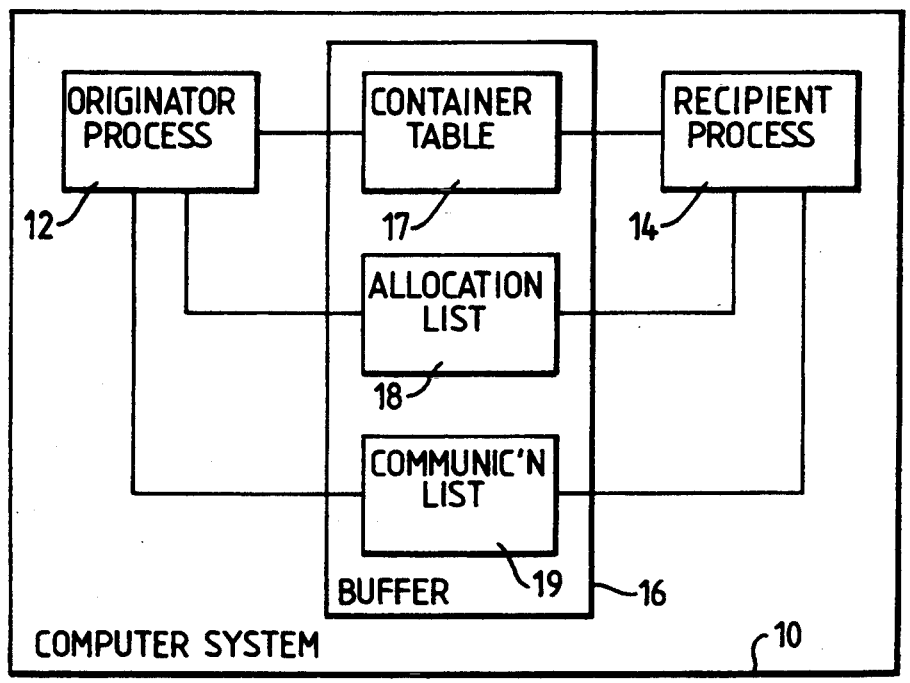
Fig.1.
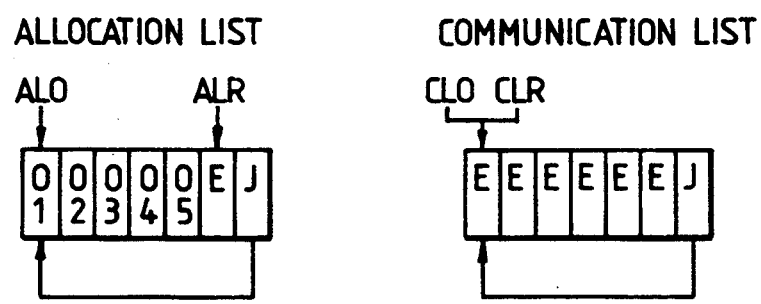
Fig.2.
Fig.3.
EXAMINE (ALO)
SET (ALO) TO EMPTY
ADVANCE ALO
WRITE DATA TO CONTAINER
WRITE INDEX OF CONTAINER TO (CLO)
SET (CLO) TO OCCUPIED
ADVANCE CLO Fig.4.
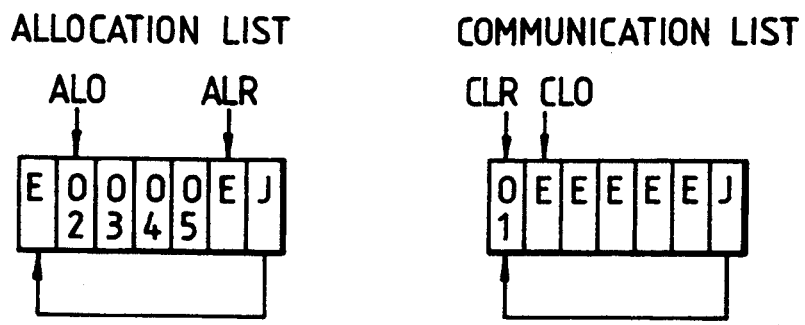
Fig.5.
EXAMINE (CLR)
READ CONTENTS OF CONTAINER
SET (CLR) TO EMPTY
ADVANCE CLR
WRITE INDEX OF CONTAINER TO (ALR)
SET (ALR) TO OCCUPIED
ADVANCE ALR
Fig.6.
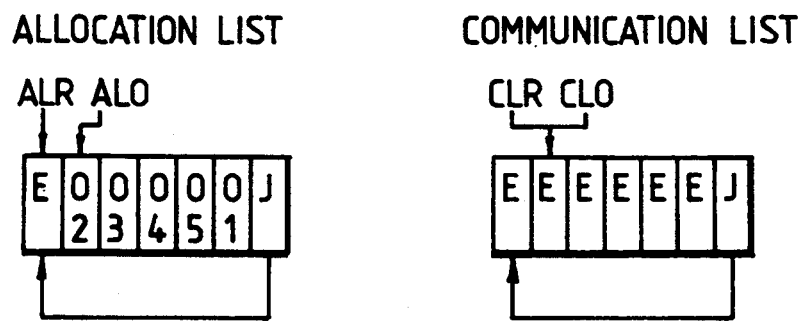

Fig. 7.
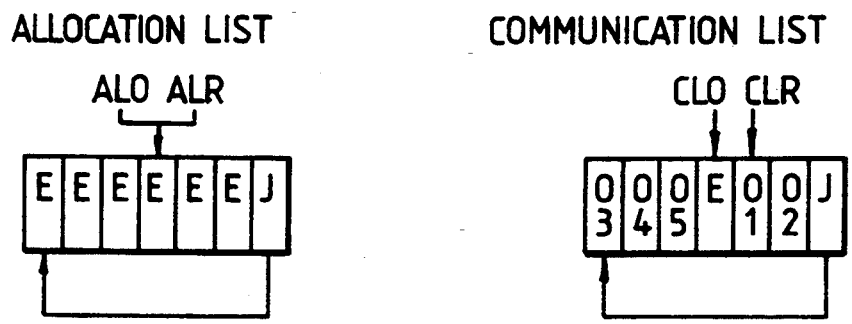
Fig. 8.
CREATE N NEW CONTAINERS
CREATE N+2 NEW ENTRIES ON ALLOCATION LIST
CREATE N+2 NEW ENTRIES ON COMMUNICATION LIST
Fig. 9.
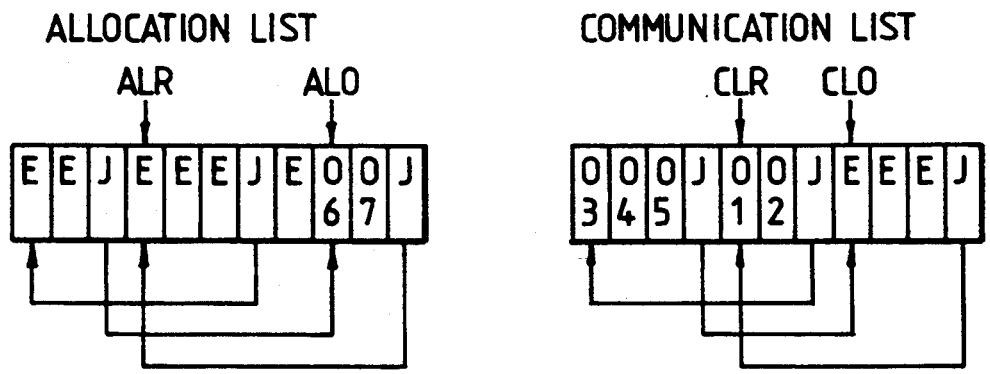

LIST-BASED BUFFERING MECHANISM FOR BUFFERING DATA BETWEEN PROCESSES IN A DATA PROCESSING SYSTEM

BACKGROUND TO THE INVENTION

This invention relates to a data buffering mechanism for a data processing system. More specifically, the invention is concerned with a mechanism for buffering data between an originator entity and a recipient entity eg between two processes.

It is known to provide a buffer to allow communication of data from one process to another without explicit synchronisation of the processes.

The object of the present invention is to provide a novel buffering mechanism which is efficient in its operation and which is potentially expandible to provide any defined size of buffer.

SUMMARY OF THE INVENTION

According to the invention there is provided a data processing system comprising a buffering mechanism for buffering data between an originator entity and a recipient entity, the buffering mechanism comprising:
  a container table comprising a plurality of data storage containers,
  an allocation list indicating which containers are free,
  a communication list indicating which containers currently hold data waiting to be read by the recipient,
  means for writing data from the originator into the first container indicated as free by the allocation list, removing that container from the allocation list and adding that container as the last container on the communication list, and
  means for reading data to the recipient from the first container indicated as in use by the communication list, removing that container from the communication list, and adding that container as the last free container on the allocation list.

BRIEF DESCRIPTION OF THE DRAWINGS

FIG. 1 is a block diagram of a data processing system including data buffering mechanism in accordance with the invention.

FIG. 2 is a schematic diagram showing the initial states of an allocation list and a communication list.

FIG. 3 is a flow diagram showing the operation of the buffering mechanism when an originator requires to communicate with a receiver.

FIG. 4 is a schematic diagram showing the states of the lists following the operator of FIG. 3.

FIG. 5 is a flow diagram showing the operation of the buffering mechanism when a receiver is ready to receive a communication.

FIG. 6 is a schematic diagram showing the states of the lists following the operation of FIG. 5.

FIG. 7 is a schematic diagram showing the states of the lists when the buffer becomes full.

FIG. 8 is a flow diagram showing the operation of the buffering mechanism when it is required to extend the size of the buffer.

FIG. 9 is a schematic diagram showing the states of the lists after extension.

DESCRIPTION OF AN EMBODIMENT OF THE INVENTION

One data processing system embodying the invention will now be described by way of example with reference to the accompanying drawings.

Referring to FIG. 1, the data processing system comprises a conventional computer system 10 which runs a number of software processes, such as, for example transaction management processes. These processes include an originator process 12 which requires to communicate data to a recipient process 14 by way of a data buffer 16.

It should be noted that the data buffer 16 to be described herein provides only one-way communication between the processes 12, 14. If two-way communication is required, a similar, separate buffer would be provided for communication in the reverse direction. Similarly, separate buffers would be provided for communication between other processes.

The data buffer 16 comprises a container table 17, an allocation list 18 and a communication list 19.

The container table 17 is an area of memory (not necessarily a single physical area) comprising a number of data buffering areas referred to herein as containers. Each container is capable of holding a data item to be communicated from the originator process 12 to the recipient process 14.

The allocation list 18 is a data structure which is used, as will be described, to keep track of which containers in the container table are free.

The communication list 19 is a data structure which is used, as will be described, to keep track of which containers in the container table contain completed data, waiting to be read by the recipient process.

Referring now, to FIG. 2, this shows the allocation and communication lists in more detail, showing their initial states.

Each of these lists comprises a sequence of entries, each entry comprising a qualifier field and an index field. The qualifier field can have one of three values:
  EMPTY(E)—indicates that the index field does not contain a valid value.
  OCCUPIED(O)—indicates that the index field contains an index value, pointing to one of the containers in the container table 17.
  JUMP(J)—indicates that the index field contains a jump index, pointing to another entry in the same list.

The allocation list has two pointers ALO and ALR associated with it. ALO determines which free container is to be allocated next. ALR determines where to record the index to the next container to be deallocated.

The communication list has two pointers CLO and CLR associated with it. CLO determines where to record the index to the next container to be written by the originator. CLR determines which container is to be read next by the recipient.

In the following description, reference is made to "advancing" the pointers ALO, ALR, CLO, CLR. This means that the pointer is incremented to the next entry in the list, ie to the right as shown in the drawings. If this entry is a jump entry (J), then the pointer is set to the value of the index field in the jump entry, ie is moved to point to the entry indicated by the jump.

It is assumed in this example that the container table 17 initially has five containers, with index values 1-5. In practice, there would normally be more containers. The allocation list and communication list each initially have two more entries than the number of containers, so that in this example they each have seven entries initially.

As can be seen from FIG. 2, the first five entries in the allocation list 18 are initialised by setting their qualifier fields to OCCUPIED (O) and setting their index fields to the index values (1–5) of the five containers in the container table. The next entry is initialised by setting its qualifier field to EMPTY (E). The last entry is initialised by setting its qualifier field to JUMP (J) and setting its index field to point back to the first entry in the allocation list, so as to logically arrange the entries in a closed loop.

All the entries in the communication list, except the last entry, are initialised by setting their qualifier fields to EMPTY (E). The last entry is initialised by setting its qualifier field to JUMP (J) and by setting its index field to point back to the first entry in the communication list, so as to form a closed loop.

The pointer ALO is initialised to point to the first occupied entry in the allocation list, corresponding to the first free container. The pointer ALR is initialised to point to the first empty entry in the allocation list.

The pointers CLO and CLR are both initialised to point to the first entry in the communication list.

Referring now to FIG. 2, when the originator wishes to communicate data to the recipient it performs the following actions.

First, the originator examines the entry in the allocation list pointed to by ALO. The value of the index field is recorded temporarily in working store.

The qualifier field of the allocation list entry is then set to EMPTY, to indicate that the container has been allocated and the ALO pointer is advanced.

The container pointed to by the index field previously recorded is then accessed and the data to be communicated is written into this container.

The index of the container is then written into the index field of the communication list entry pointed to by CLO and the qualifier field of this entry is set to OCCUPIED, to indicate that the container now holds completed data.

Finally, the CLO pointer is advanced.

FIG. 4 shows the state of the lists after performing these actions. It can be seen that container 1 is now in use, holding data to be communicated to the recipient; containers 2–5 are all still unused.

Referring now to FIG. 5, when the recipient is ready to receive data it periodically performs the following actions.

First, the recipient examines the communication list entry pointed to by CLR and checks whether this entry is OCCUPIED. If so, the container indexed by this entry is accessed and its contents are read out for processing by the recipient.

The entry pointed to by CLR is then set to EMPTY, to indicate that the data in the container has now been read, and the CLR pointer is advanced.

The index of the container that has been read is now written into the index field of the allocation list entry pointed to by ALR and this entry is set to OCCUPIED, to indicate that the container is now de-allocated. Finally, the ALR pointer is advanced.

FIG. 6 shows the state of the lists after these actions have been performed. It can be seen that all the containers are now unused.

If the originator allocates containers faster than the recipient de-allocates them, eventually all the containers will be allocated and there will be no free containers. FIG. 7 shows the state of the lists in this situation. In this case, the pointers ALO and ALR both point to the same empty entry in the allocation list.

Referring now to FIG. 8, when the originator requires to extend the buffer, it performs the following actions.

First, the originator creates a selected number N of new containers in the container list.

N+2 new entries are then created in the allocation list.

The first new entry is set to EMPTY. The next N of these new entries are set to OCCUPIED and have their index fields set to the index values (6, 7) to the newly created containers. The last new entry is a JUMP to the entry currently pointed to by the ALO pointer.

The last empty entry logically preceding the ALO pointer is then converted to a JUMP to the second new entry. Finally, the ALO pointer is moved to point to this first new entry.

The resulting state of the allocation list, for the case where N=2, is shown in FIG. 9.

Similarly, N+2 new entries are created in the communication list.

The first N+1 of these new entries are set to EMPTY. The last of the new entries is a JUMP to the first entry following the CLO pointer.

The entry currently pointed to by the CLO pointer is then converted to a JUMP, to the first new entry. Finally, the CLO pointer is moved to point to this first new entry.

The resulting state of the communication list is as shown in FIG. 9.

It can be seen that the effect of this is to add N new containers into the loop ahead of the pointers ALO, CLO, for the originator to allocate and to write data into. The arrangement of jumps in the two lists ensures that the recipient pointers ALR, CLR always follow the originators pointers ALO, CLO through the same sequence of entries, so that the recipient will always read data from the containers in exactly the same sequence as that in which they were written by the originator.

The buffer may be extended repeatedly by this method, each time adding a further N containers to the container table and a further N+2 entries to the allocation list and communication list. The maximum size of the buffer is potentially infinite although in practice it is, of course, limited by the size of the pointers and the amount of available memory space.

It should be noted that the originator may write to the containers asynchronously. As a result, the containers may be written to in a different order from that in which they were allocated, ie the order of the containers on the communication list may be different from their original order on the allocation list. Also there may be a delay between the allocation of a container and the completion of writing of data to it, during which time the container will appear on neither the allocation list nor the communication list.

I claim:
1. A data processing system comprising:
  (a) a buffer comprising a plurality of data storage containers;
  (b) an originator entity, coupled to said buffer, for writing data into said buffer;

(c) a recipient entity, coupled to said buffer, for reading data from said buffer;
(d) a first list comprising a sequence of entries, said first list having a head and a tail; and
(e) a second list comprising a sequence of entries, said second list having a head and a tail;
(f) said originator entity comprising means for removing an entry from the head of the first list, and for using said entry from the head of the first list as an index for selecting one of said data storage containers for writing by said originator entity, and for then adding said entry from the head of the first list to the tail of the second list; and
(g) said recipient entity comprising means for removing an entry from the head of the second list, and for using said entry from the head of the second list as an index for selecting one of said data storage containers for reading by said recipient entity, and for then adding said entry from the head of the second list to the tail of the first list.

2. A system according to claim 1 wherein said sequence of entries in each of said first list and said second list include jump entries for indicating jumps in said sequence.

3. A system according to claim 2 wherein there are M of said data storage containers in said buffer and wherein there are M+2 of said entries in each of said first list and said second list.

4. A system according to claim 3 wherein said originator entity further includes means for extending said buffer by:
(a) creating N new data storage containers in said buffer; and
(b) creating N+2 new entries in each of said first list and said second list, said new entries including two jump entries in each of said first list and said second list.

5. In a data processing system comprising:
(a) a buffer comprising a plurality of data storage containers;
(b) an originator entity, coupled to said buffer, for writing data into said buffer;
(c) a recipient entity, coupled to said buffer, for reading data from said buffer;
(d) a first list comprising a sequence of entries, said first list having a head and a tail; and
(e) a second list comprising a sequence of entries, said second list having a head and a tail;
a method of transferring data between said originator entity and said recipient entity comprising steps as follows:
(i) removing an entry from the head of the first list;
(ii) using said entry from the head of the first list as an index for selecting one of said data storage containers;
(iii) writing data from said originator entity into said one of said data storage containers referred to in step (ii);
(iv) adding said entry from the head of the first list to the tail of the second list;
(v) removing an entry from the head of the second list;
(vi) using said entry from the head of the second list as an index for selecting one of said data storage containers;
(vii) reading data to said recipient entity from said one of said data storage containers referred to in step (vi); and
(viii) adding said entry from the head of the second list to the tail of the first list.

* * * * *